United States Patent [19]
Hammer

[11] Patent Number: 5,276,372
[45] Date of Patent: Jan. 4, 1994

[54] RECIPROCATING ELECTRIC MOTOR

[76] Inventor: Charles F. Hammer, 7468 Alicante Rd., Carlsbad, Calif. 92009

[21] Appl. No.: 902,902

[22] Filed: Jun. 22, 1992

[51] Int. Cl.$^5$ .............................................. H02K 7/06
[52] U.S. Cl. ............................................ 310/24; 310/16
[58] Field of Search .................... 310/15, 23, 24, 34, 310/35, 16

[56] References Cited

U.S. PATENT DOCUMENTS

| | | | |
|---|---|---|---|
| 3,676,719 | 7/1972 | Pecci | 310/24 |
| 4,309,632 | 1/1982 | Muller et al. | 310/52 |
| 4,317,058 | 2/1982 | Blalock | 310/24 |
| 4,510,420 | 4/1985 | Sasso | 310/24 X |
| 4,523,114 | 6/1985 | Smith | 310/24 |
| 4,541,787 | 9/1985 | DeLong | 310/35 X |
| 4,658,170 | 4/1987 | Ueda | 310/214 |
| 4,692,673 | 9/1987 | DeLong | 310/17 X |
| 4,697,113 | 9/1987 | Young | 310/15 |
| 4,749,893 | 6/1988 | Reynolds | 310/24 |
| 4,882,509 | 11/1989 | Wottlin | 310/46 |
| 5,030,863 | 7/1991 | Yoshimura et al. | 310/52 |

Primary Examiner—Steven L. Stephan
Assistant Examiner—Judson H. Jones
Attorney, Agent, or Firm—Thomas J. Tighe

[57] ABSTRACT

The rotor of an electric motor is a crank shaft driven through connecting rods by piston-like reciprocating members powered by superconducting electromagnets. The electromagnets can be solenoids of conventional material cryogenically cooled to superconduct. In the preferred embodiment, the solenoids reside in a thermally insulated chamber filled with liquid gas coolant. The reciprocating members each have a head which is a linearly moveable core of a solenoid The reciprocating members also each have a base which travels in a cylinder defined by a motor block. The motor block can be a conventional block as in an internal combustion engine. A rotating disk having edge commutators electrodes distributes electrical energy to the solenoids in alternating polarity sequences. Sets of solenoids are electrically in parallel to operate in tandem. Conventional internal combustion, piston-driven engines can be modified to be an electric motor as described above.

9 Claims, 3 Drawing Sheets

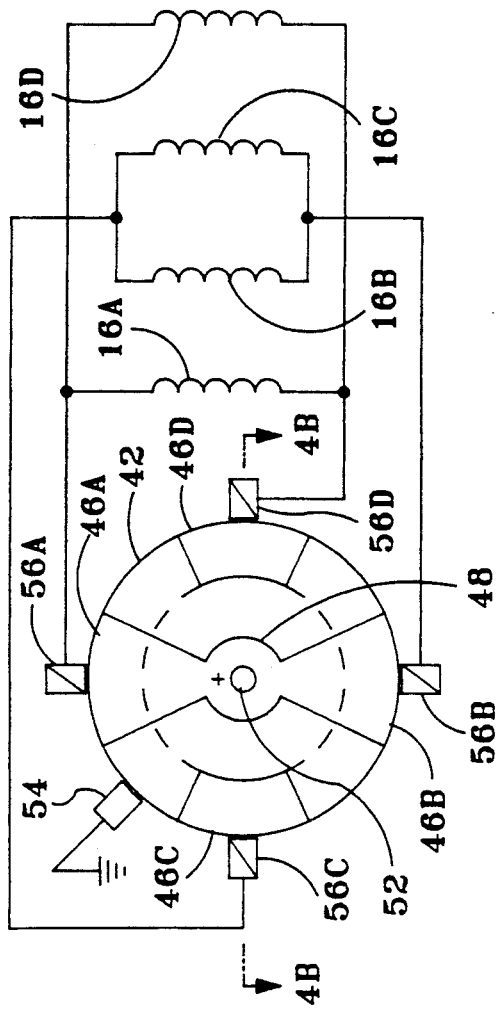
FIG._4A
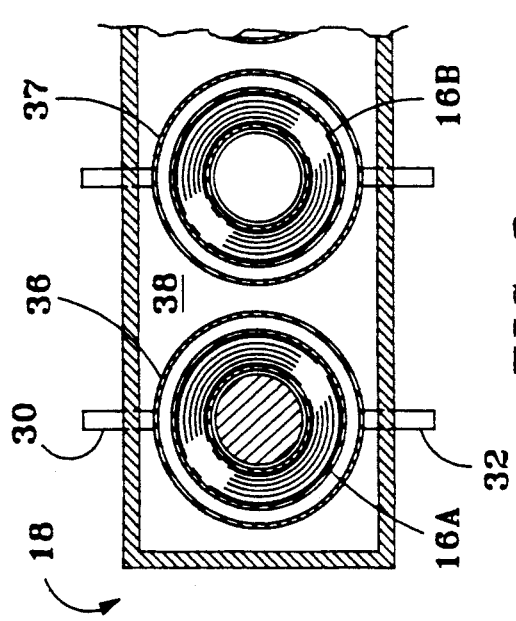
FIG._3
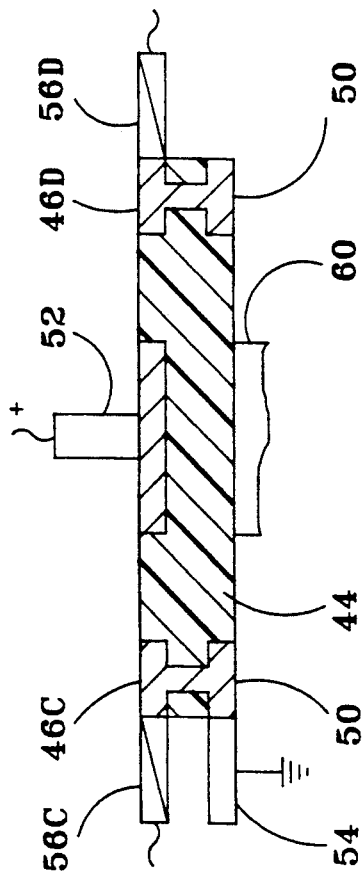
FIG._4B

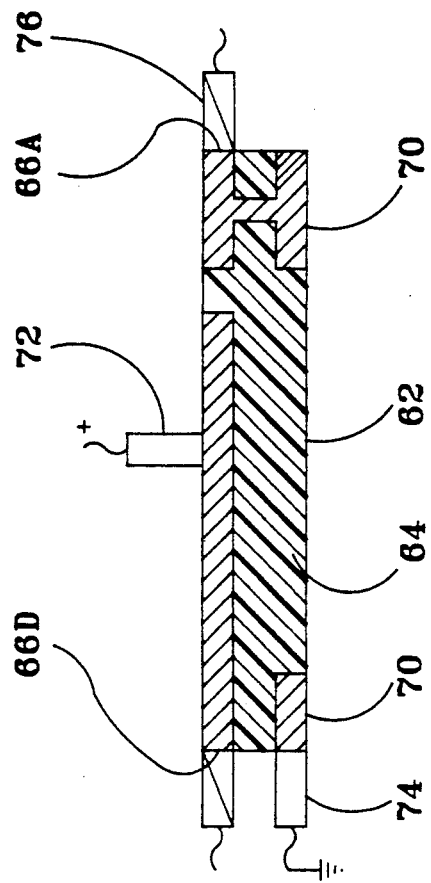
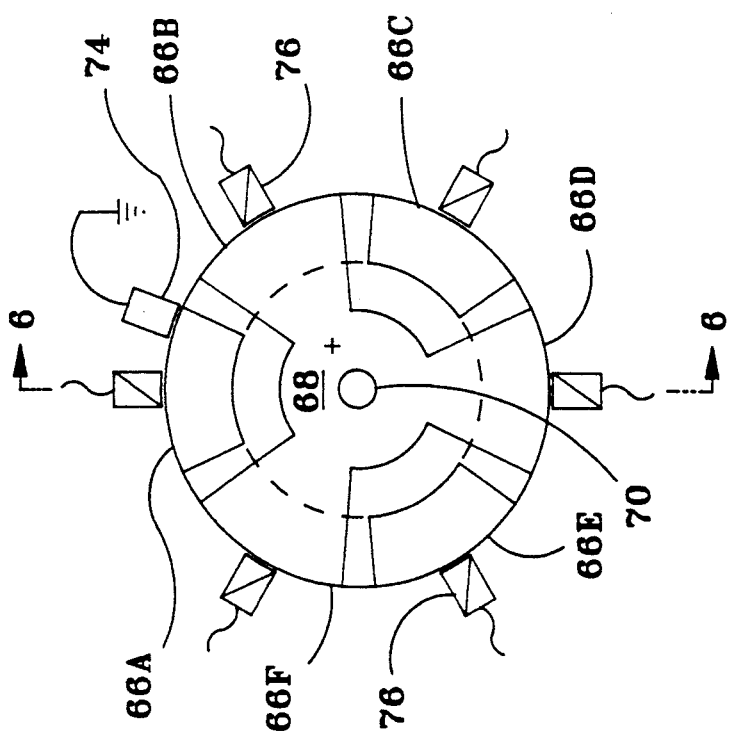

RECIPROCATING ELECTRIC MOTOR

BACKGROUND OF THE INVENTION

This invention relates in general to electric motors having rotors eccentrically driven by linearly reciprocating members that are powered by superconducting electromagnets, and in particular to those in which the electromagnets are solenoids that are cooled cryogenically to superconduct.

Although the prior art contains electric motors having rotors driven by reciprocating members that are powered by electromagnets, heretofore they have been very inefficient. The invention described herein is much more efficient than such prior art devices.

Heretofore, cryogenically cooled motors have been disclosed. Complex ways have been devised to cryogenically cool the field windings of such motors, particularly field windings on a rotor. This invention overcomes the difficulties of such prior art devices by allowing the field windings to be stationary with respect to the motor housing.

Other advantages and attributes of this invention will be readily discernable from a reading of the text hereinafter.

SUMMARY OF THE INVENTION

An object of this invention is to present an electric motor comprising a rotor eccentrically driven by linearly reciprocating members powered by superconducting electromagnets.

A further object of this invention is to present an electric motor in which cryogenically cooled electromagnetic field windings are stationary with respect to the motor housing allowing the means for cooling the windings to be much simpler and less expensive than in motors where field windings move, as in a rotor.

A further object of this invention is to provide a means for converting conventional internal combustion motors having reciprocating pistons to be powered by electricity.

A further object of this invention is to provide a means for converting conventional internal combustion motors having reciprocating pistons to be powered by electricity using the preexisting timing mechanisms to cyclically commutate the applied electric energy.

These and other objects are achieved by a motor comprising a plurality of electromagnets, in the form of solenoids, having respective magnetic core shafts that are moved linearly by magnetic fields generated by their respective electromagnets, the core shafts each being the head of a reciprocating member also having a base that slidingly and coaxially fits in a corresponding cylinder of a motor block. Sets of electromagnets are cyclically energized to drive the core shafts and thus the reciprocating members in reciprocating motion Each electromagnet is disposed in a bath of coolant, the coolant keeping the electromagnets at a temperature sufficient for them to superconduct Means are also provided for cyclically commutating electric energy to tandemly operating sets of electromagnets. Preferably the polarity of electric energy distributed to each set of electromagnets is cyclically reversed in sequence in order to both push and pull the piston heads (i.e. the core shafts) by the fields generated by the electromagnets. Preferably the electromagnets are solenoids annular to respective cylindrical sleeves in which the piston heads operate, each solenoid residing in a bath of coolant in a thermally insulated chamber. The temperature of the coolant is maintained at or below a superconducting threshold of the solenoids by conventional refrigeration means.

BRIEF DESCRIPTION OF THE DRAWINGS

FIG. 3 is a cross-sectional view of a portion of a motor head according to this invention taken along line 3—3 of FIG. 1.

FIG. 4A is a plan view of an electric energy distributor and a schematical representation of the coils it energizes, according to this invention, for a motor having four reciprocating units.

FIG. 4B is a cross-sectional view of the distributor of FIG. 4A taken along line 4B—4B.

FIG. 5 is a plan view of an electric energy distributor, according to this invention, for a motor having six reciprocating units.

FIG. 6 is a cross-sectional view of the distributor of FIG. 5 taken along line 6—6.

DESCRIPTION OF THE PREFERRED EMBODIMENT

Figures 1, 2:
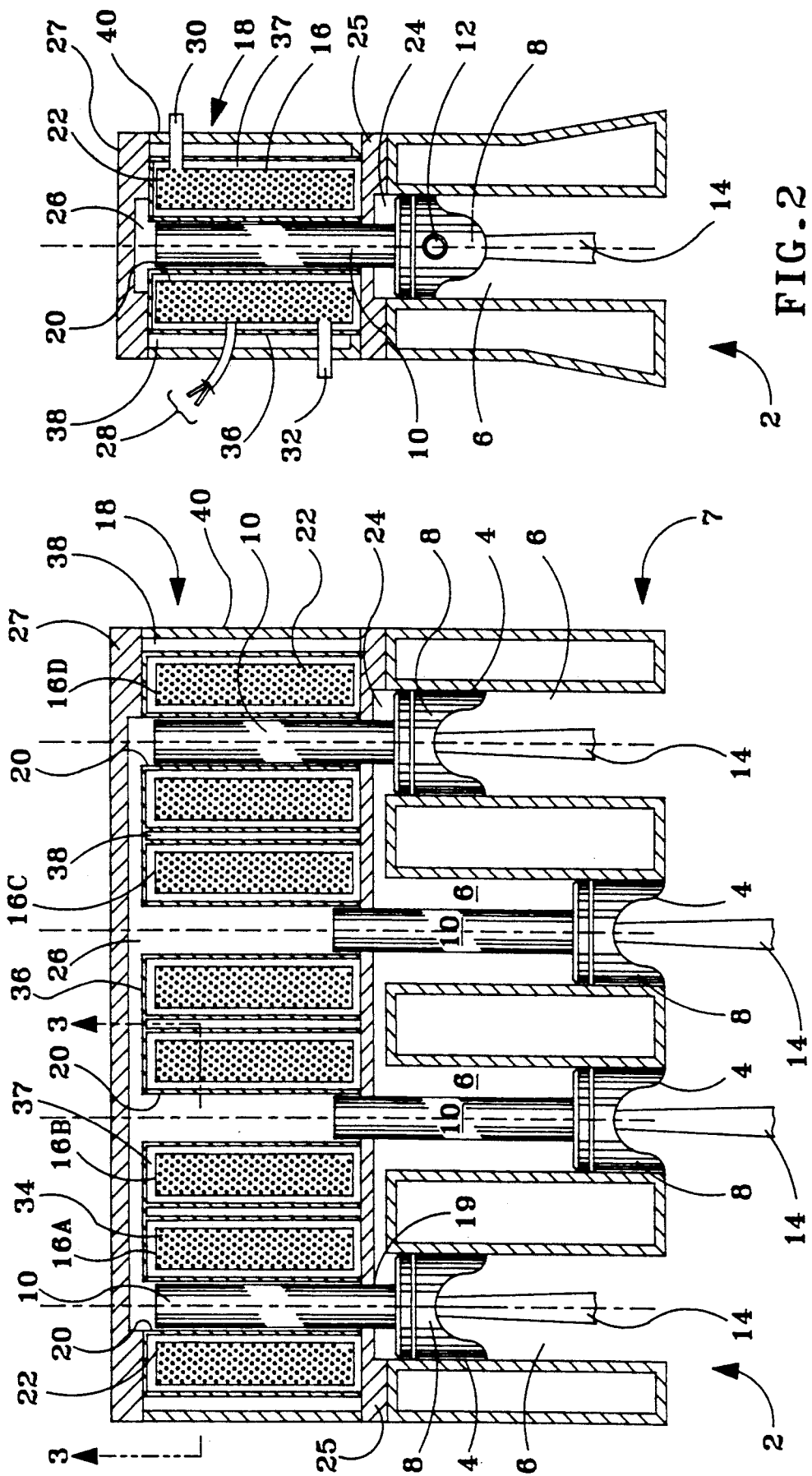
FIG. 1 is a cross-sectional view taken along a longitudinal median plane of the motor.
FIG. 2 is a cross-sectional view of one reciprocating unit of the motor taken through the center of the unit along a plane traverse to the longitudinal axis of the motor.

Referring to FIGS. 1-3, this invention is illustrated as an electrically powered motor, generally designated 2, which resembles an internal combustion, piston driven motor in structure. Four reciprocating members illustrated as specially adapted pistons 4 operate in four cylinders 6 defined by a housing, generally designated 7. The housing can be the engine block pre-existing in a conventional internal combustion engine converted to electric power according to this invention, and the cylinders can be those pre-existing in the engine block. The reciprocating members drive a crank shaft (not shown) which can be of conventional design, e.g. like those found in internal combustion engines for vehicles. A major difference between an internal combustion engine and a motor according to this invention is that the pistons are not driven downward by an exploding gas, but rather they are moved in reciprocating motion by magnetic fields created by superconducting electromagnets.

The pistons 4 each have a cylindrical base 8 having a diameter suitable for free but guided reciprocal movement within their respective cylinders. The pistons each have a head 10 that is illustrated as a cylindrical shaft projecting from and coaxial with the base having a diameter reduced from that of the base. Each piston base has a wrist pin 12 journaled therein on which pivots a connecting rod 14 to drive a crank shaft (not shown). The piston heads function as linearly movable cores of respective electromagnets which are illustrated as solenoids, 16A-16D. The solenoids are wrapped annularly around respective cylindrical sleeves 20 and together are disposed in line in a motor head, generally designated 18. Each solenoid sleeve singularly registers coaxially with a piston head which operates therein, and each sleeve is slightly larger in diameter than the piston head which operates therein to allow free and unrestricted movement of the piston head. Preferably both the sleeves and the piston heads are respectively uniform in dimensions.

The solenoids are disposed in respective baths of a fluid coolant 22, such as liquid helium, maintained at a temperature at or below a threshold at which the solenoid superconducts. The solenoids can be constructed of the newly discovered superconductive materials and reside in a bath of liquid nitrogen which would cause them to superconduct. The important point is that means are provided to make the solenoids superconduct in order to maximize the efficiency of this motor.

Referring again to FIGS. 1-3, it should be noted that the pistons 4 do not compress any gas, but rather there is a free flow of gas, such as air, between and amongst the motor block cylinders 6 via a channel 24 formed by an elongated recess open to all cylinders defined by a thermal insulation strip 25 disposed between the motor head 18 and the motor block 7. Openings 19 are also defined by the strip 25 to accommodate movement therethrough of respective piston heads, and each such opening is tight enough around its respective piston head to act as a guide without unduly restricting movement of the piston head. The thermal insulation strip minimizes heat transfer between the motor head and the motor block. To minimize heat transfer between the motor block and motor head due to air movement through the openings 19, a gas seal could line the openings. There is also a similar gas flow channel 26 open to all the solenoid sleeves 20 formed by an elongated recess defined by a strip 27 that caps the motor head. Preferably the capping strip is also a thermal insulator to minimize heat transfer into the motor head.

Referring again to FIGS. 1-3, electric leads 28 pass through walls of the motor head to provide a current path for energizing the solenoids. Also passing through walls of the motor head for each solenoid are an inlet port 30 and an outlet port 32 which together provide for a continual flow of coolant through a coil chamber 34 in which the solenoid resides. Each coil chamber is defined by a thermally insulating wall 36 comprising a double wall of thermal insulation material with a vacuum space 37 therebetween. The double wall completely envelopes the solenoid in order to minimize heat transfer into the chamber. Necessary structural support members (not shown) pass through the vacuum to hold the inner wall in place. The aforesaid passages through the walls are hermetically sealed preferably by sealant material having suitable thermal insulation properties. Other well known means for insulating the coil chambers may be used alternatively or in combination with a surrounding vacuum.

The apparatus for cycling the coolant through the coil chambers (not shown) is of conventional design and is not a part of this invention. Alternately the coolant can be injected into each chamber and the chambers then sealed, as by welding. In this alternate embodiment, the motor head is kept cold enough by conventional means (not shown) to maintain the coolant in each of the chambers at a temperature which causes the solenoids to superconduct. For further thermal insulation, there exists air gaps 38 between adjacent solenoids and between the solenoids and the motor head casing 40.

Referring to FIGS. 4A and 4B, illustrated is a means for cyclically commutating electric energy to tandemly operating solenoids. A rotating disk 42, primarily composed of electrical insulation material 44, has four edge commutator electrodes, 46A-46D, uniformly centered 90° apart around the disk's axis of rotation. The commutator electrodes circumscribe uniform arcs along the disk's edge, the angle subtended by each arc depending on the angle of the pistons' power stroke, preferably approximately 320°. A first pair of oppositely disposed commutator electrodes, 46A and 46B, are in communication with an electrode 48 centered on a first side of the disk, and the second pair of commutator electrodes, 46C and 46D, are in electrical communication with an electrode 50 which is a marginal strip circumscribing the second side of the disk. The first pair of commutator electrodes receive a positive voltage via a brush contactor 52 which brushes against the first-side centered electrode 48. The second pair of commutator electrodes receive a reference electric potential (in the case of the preferred embodiment, a ground reference) via a brush contactor 54 which brushes against the second-side marginal strip electrode 50. Four electrical brush contactors, 56A-56D are disposed 90° apart around the edge of the commutator disk and brush against said edge. Electrically the two outer solenoids (16A and 16D as shown in FIG. 1) are connected in parallel with opposite ends communicating with a first pair, 56A and 56D, of the brush contactors, and the two inner solenoids (16B and 16C as shown in Fig. 1) are connected in parallel with opposite ends communicating with a second pair, 56B and 56C, of the brush contactors. By these connections the two outer solenoids are energized in tandem and the two inner solenoids are energized in tandem.

Referring again to FIGS. 4A and 4B, the disk 42 is rotated by a shaft 60 to which it is affixed and as the disk is rotated, the tandem pairs of solenoids are energized in a sequence. While the disk can be rotated in either direction, for purposes of describing the sequence, it will be assumed that the disk is rotating clockwise. At the disk's position, as illustrated in FIG. 4A, the outer pair of solenoids, 16A and 16D, are receiving a positive voltage at one end via brush 56A and are receiving a ground potential at their other end via brush 56D. Thus current flow, as it is conventionally designated, will be flowing through the outer pair of solenoids from top to bottom in the illustration. At the same time, the inner pair of solenoids is receiving a positive voltage via brush 56B at one end and a ground potential at the other end via brush 56C. Thus the current flow through the inner pair of solenoids will be from bottom to top in the illustration, just the opposite of the current flow through the outer two solenoids. Thus the polarity of energization of the tandemly operating pairs of solenoids is opposite. This in turn causes the pairs of piston heads respectively associated with the tandem pairs of solenoids to a moving in opposite directions. When the disk rotates clockwise 45° from its position as illustrated in FIG. 4A, all four solenoids will be de-energized. When the disk continues and moves another 45° clockwise, the polarities of the energies applied to the pairs of solenoids will be reversed causing their respective pairs of piston heads to move in a direction opposite to the direction they were just previously moving. Thus for each revolution of the disk, the piston heads, and thus the pistons, will complete four strokes, two up and two down, which is two complete cycles of reciprocating movement. This timing relationship is advantageous when modifying an existing internal combustion engine as will be explained below. The arrangement of commutators around the commutator disk will allow it to be rotated directly by the same shaft that rotated a preexisting distributor rotor of a four cylinder, four stroke internal combustion engine modified according to this invention. In other words, it can be rotated at the same angular velocity.

FIG. 5 illustrates an embodiment of a commutator disk 62 for a motor having six reciprocating units, and FIG. 6 illustrates this embodiment in cross-section. The disk 62 is primarily composed of electrical installation material 64 and has six edge commutator electrodes, 66A-66F, uniformly centered 60° apart around the disk-'axis of rotation. The commutator electrodes circumscribe uniform arcs along the disk's edge, the angle subtended by each arc depending on the angle of the pistons' power stroke. A first triplet of the commutators electrodes, 66B, 66D and 66F, each 120° apart are in communication with an electrode 68 centered on a first side of the disk. A second triplet of the commutator electrodes, 66A, 66C and 66E, each spaced 120° apart and interlaced with the first triplet are in electrical communication with an electrode 70 which is a marginal strip circumscribing the second side of the disk. The first triplet of commutator electrodes receives a positive voltage via a brush contactor 72 which brushes against the first-side centered electrode 68. The second triplet of commutator electrodes receive a reference electrical potential (in the case of the preferred embodiment, a ground reference) via a brush contactor 74 which brushes against the second-side marginal strip electrode 70. Six uniform electrical brush contactors 76 are disposed 60° apart around the edge of the commutator disk and brush against said edge. These brush contactors provide alternating polarity energization in sequential fashion to six solenoids (not shown) which drive respective pistons the same as described with reference to FIGS. 1-4B. This embodiment allows the commutator disk to be directly rotated by the same shaft that rotated a spark voltage distributor in a conventional six cylinder engine modified according to this invention.

To modify an existing internal combustion, piston-driven four stroke engine, the preexisting pistons are replaced with the pistons 4 as described above with reference to FIGS. 1 and 2, and the high voltage distributor and rotor are replaced with a commutator disk of the kind described above with reference to FIGS. 4A-6 adapted to the number of cylinders. These commutators can be rotated by the existing distributor shaft and use the existing engine timing mechanisms. In other words, the basic engine timing need not be changed because the commutator disk can revolve at the same rate as did the distributor rotor, one revolution per four strokes of the pistons. The engine heads and gaskets are replaced with the motor heads and thermal insulating strips 25 as described above with reference to FIGS. 1 and 2. The base of the new pistons may require oil seal rings but not the conventional compression rings because the function of the oil rings would only be to prevent lubricating oil from entering the new motor head. If this is not needed then no rings would be required The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. A method for converting an internal combustion, piston driven engine to be powered by electricity comprising the steps:
   (a) replacing the preexisting pistons with corresponding replacement pistons each of which comprises a base that slidingly fits the engine block cylinder of the corresponding piston it is replacing and that pivotally mates with said corresponding piston's connecting rod, the head of each replacement piston being a cylindrical shaft of magnetic solenoid core material coaxially projecting head-wise from the base,
   (b) replacing each engine head with a replacement head comprising: for each replacement piston a corresponding solenoid wrapped around a core sleeve, and means for cryogenically cooling the solenoids to a temperature at which they superconduct, the core sleeve of each solenoid in each head coaxially registering with the head of its corresponding replacement piston, and
   (c) replacing the engine's preexisting high voltage distributor with means for cyclically commutating electric energy to tandemly operating sets of solenoids.

2. A kit for converting an internal combustion, piston driven engine to be powered by electricity comprising the steps:
   (a) a plurality of reciprocating means each for replacing a corresponding preexisting piston, each reciprocating means comprising a base that slidingly fits the engine block cylinder of the corresponding piston it is replacing and that pivotally mates with said corresponding piston's connecting rod, the head of each reciprocating means being a cylindrical shaft of magnetic solenoid core material coaxially projecting head-wise from the base,
   (b) one or more motor head means each for replacing a preexisting engine head, each motor head means comprising: for each reciprocating means a corresponding solenoid wrapped around a core sleeve, and means for cryogenically cooling the solenoids to a temperature at which they superconduct, the core sleeve of each solenoid in each head coaxially registering with the head of its corresponding reciprocating means, and
   (c) means for cyclically commutating electric energy to tandemly operating sets of solenoids, which means replaces the engine's preexisting high voltage distribution system.

3. The kit according to claim 2 wherein the means for cyclically commutating electric energy to tandemly operating sets of solenoids comprises a rotating electric commutator rotatable at an angular rate at which a rotor of the high voltage distribution system was rotated.

4. The kit according to claim 2 wherein the head of each reciprocating means is a permanent magnet for having magnetic force applied thereon during both strokes of all reciprocation cycles.

5. The kit according to claim 3 wherein the head of each reciprocating means is a permanent magnet for having magnetic force applied thereon during both strokes of all reciprocation cycles.

6. A reciprocating electric motor comprising:
   (a) a motor block defining a plurality of cylinders,
   (b) a corresponding plurality of connecting rod means for driving a rotor, (c) a corresponding plurality of reciprocating means each comprising: a base that slidingly fits its corresponding motor block cylinder for reciprocation therein and that pivotally mates with its corresponding connecting rod means, and a head comprising a cylindrical shaft of magnetic solenoid core material coaxially projecting from the base oppositely from the connecting rod mating, (d) motor head means for mounting atop the motor block comprising: for each reciprocating means a corresponding solenoid wrapped around a core sleeve, and means for cryogenically cooling the solenoids to a temperature at which they superconduct, the core sleeve of each solenoid coaxially registering with the head of its corresponding reciprocating means, and (e) means for cyclically commutating electric energy to tandemly operating sets of solenoids.

7. The motor according to claim 6 wherein the means for cyclically commutating electric energy to tandemly operating sets of solenoids comprises a commutator disk that commutates the energy applied to each tandemly operating set of solenoids an even plurality of times for each revolution of the disk.

8. The motor according to claim 6 wherein each head of a reciprocating means is a permanent magnet for having magnetic force applied thereon during both strokes of all reciprocation cycles.

9. The motor according to claim 7 wherein each head of a reciprocating means is a permanent magnet for having magnetic force applied thereon during both strokes of all reciprocation cycles.

* * * * *